Jan. 3, 1956 E. J. FINNEGAN 2,729,015
FISHING BOBBER
Filed Sept. 30, 1954
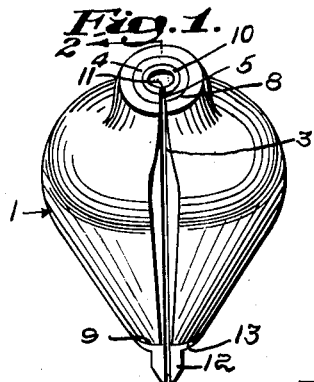
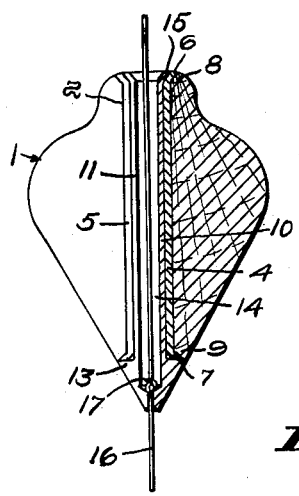 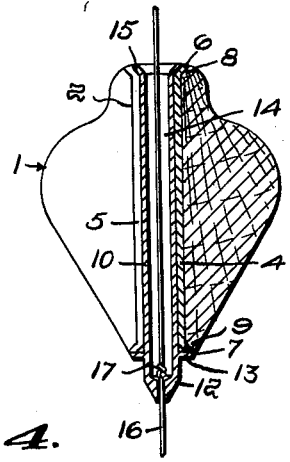
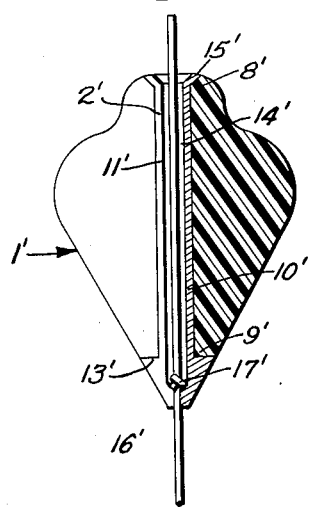 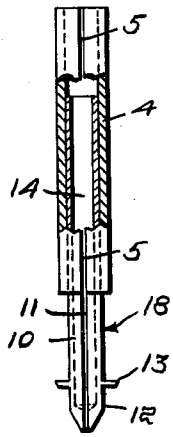
Inventor:
Edward J. Finnegan
by Aaron Tushin
Attorney United States Patent Office 2,729,015
Patented Jan. 3, 1956

2,729,015
FISHING BOBBER
Edward J. Finnegan, Methuen, Mass.
Application September 30, 1954, Serial No. 459,458
2 Claims. (Cl. 43—44.9)

This invention concerns a casting float or bobber for fishing lines and more particularly that type of fishing bobber which permits free passage of the fishing line to a predetermined point along the line.

It is an object of this invention to provide a fishing bobber or float of the character hereinafter described which will be economical to manufacture, of simple and dependable construction, easy to use, of reliable operation, and which will be unlikely to require repair.

Another object of this invention is to provide a fishing bobber or float of the character hereinafter described that is particularly suited for bait casting wherein the line and the lure are drawn to the casting rod by winding the line on a reel and then casting it out into the water.

Another object of this invention is to provide a fishing bobber or float of the character hereinafter described which may be easily affixed to or removed from a fishing line.

Another object of this invention is to provide a fishing bobber or float that while affixed to the line will permit the line to slip freely through it.

Another object of this invention is to provide a fishing bobber or float that will permit a predetermined length of fishing line to extend beyond it.

Other objects and advantages of this invention will become apparent from examination of the accompanying drawings and during the course of the following description.

In the accompanying drawings, forming a part of this application, and in which like numerals are employed to identify like parts throughout:

Figure 1 is a perspective view of a bobber embodying the invention:

Figure 2 is an elevation view, partly in section on line 2—2 of Figure 1 with the fishing line inserted therein;

Figure 3 is a similar view as shown in Figure 2 with the inner unit rotated 90° to show the finger grip in locked position.

Figure 4 is a fragmentary elevation view of the line-holding tube and bushing arrangement showing the slots, parts being broken away for illustration purposes.

Figure 5 is a similar view as shown in Figure 2, except the bushing member has been omitted.

In the drawings wherein for the purpose of illustration is shown a preferred embodiment of the invention, the numeral 1 refers to the float body composed of a buoyant material and of any shape. A central bore or hole 2 of uniform diameter extends longitudinally throughout the length of float body 1, and a body slot 3 extends radially outward from the bore 2 to intersect the surface of float body 1 along its entire length. The bushing 4, containing the bushing slot 5, fits tightly into bore 2 of float body 1 (Fig. 2) so that the two slots 3 and 5 are in line with each other. Both slots are wide enough to receive a fishing line. The bushing 4 is permanently fixed in position and prevented from rotating within float body 1 by flaring the ends 6 and 7 of the bushing 4 tightly over the ends 8 and 9 of the float body 1. If the float body 1 is made of material, such as wood, that swells when immersed in water, then such swelling will also act to hold the bushing 4 firmly in place.

The line-holding tube or tubular portion 10 containing the tube slot 11, slightly wider than the thickest fishing line normally used in line casting, fits with slight friction within the bushing 4 with its integral finger grip 12 and flange or stop 13 at the end 9 of float body 1. The line-holding tube 10 with the slot 11, finger grip 12 and flange 13 together comprise the inner unit 18 (Fig. 4).

The tube slot 11 extends the full length to the tip of finger grip 12, reaching in depth to the central longitudinal axis of the tube 10 along the full length of the finger grip 12 and flange 13. The central longitudinal axis of tube 10 coincides with those of bore 2 and bushing 4. On the other hand, the central bore 14 of the line-holding tube 10 (Fig. 4), appreciably greater in diameter than the width of tube slot 11, extends for the full length of float body 1, but not appreciably beyond the flange 13 of line-holding tube 10. Thus the slot 11 of line-holding tube 10 is appreciably longer than the central bore 14 of the same.

The end 15 (Fig. 3) of line-holding tube 10 is flanged over the end 6 of the bushing 4. Because of the flanged ends 15 and 13 of line-holding tube 10, said tube cannot move along the central longitudinal axis of float body 1.

If the float body 1 is made of some material, such as plastic, that does not swell when immersed in water, then the bushing 4 may be eliminated and the bore 2' (Fig. 5) of float body 1' can be reduced in diameter to fit with slight friction around the line-holding tube 10'. The ends 15' and 13' of the line-holding tube 10' would then be flanged over the ends 8' and 9' of the float body 1'. The remaining elements 11', 14', 16', and 17' remain the same as their corresponding parts 11, 14, 16, and 17 as shown in Fig. 2 above.

To operate this invention the slot 11 of the tube 10 is aligned with the slots 3 and 5 by rotating the finger grip 12. Then a fishing line 16 with a knot or other obstruction of small diameter 17 at some predetermined distance above the hook (not shown) is slipped into the full length of slot 11 through the slots 3 and 5 so that the hook extends below the finger grip 12 and the knot 17 is above the end 15 of the tube 10. Then the finger grip 12 is turned to rotate line-holding tube 10 so that the slot 11 is no longer aligned with the slots 3 and 5. Friction between the ends and surfaces of the tube 10 and bushing 4 maintains the tube 10 in any position to which it may be rotated. To remove the fishing line 16 from the float the procedure just described is reversed.

Because the bore 14 of the tube 10 is appreciably larger in diameter than the diameter of the fishing line 16, the line 16 and knot 17 are free to move along the tube 10 towards the flange 13 below which the bore 14 terminates. At this point the fishing line 16 still fits in the slot 11 extending to the tip of the finger grip 12, but the knot 17 cannot slide below the point where bore 14 terminates because said knot is appreciably larger than the width of the slot 11. Thus the knot 17 prevents more than the desired length of fishing line 16 from extending beyond the end 9, of the buoyant float body 1. Consequently the distance of the weighted hook, not shown, below the water surface is governed by the position of the knot 17 on the fishing line 16.

It will thus be apparent that this invention provides a float peculiarly suited for "bait cast fishing." When the fishing line is drawn in toward the rod, the float passes along the line in a direction towards the hook until it meets the hook or some knot or obstruction between the float and the hook that is too large to enter the slot 11 of tube 10. When the line is cast, the weight of the float permits the line to be cast appreciably great distances and once the weighted hook is in the water the line passes freely through the float until the knot or other obstruction that cannot pass through the slot 11 is reached. It is obvious that the depth at which the hook is maintained below the water surface is controlled and regulated by the position of the knot along the length of the fishing line.

In one specific embodiment of this invention the buoyant float body of wood is shaped like a toy top with a 1/32 inch slot extending to its central bore. The line-holding tube is composed of a thin walled aluminum tube 1/4 inch in diameter and with a slot 1/32 inch wide extending along its entire length including the flanged finger grip. The bushing is composed of a thin-walled aluminum tube 3/8 inch in diameter and with a slot 1/32 inch in width along its entire length.

It is to be understood that the form of this invention, herewith shown and described, is to be taken as a preferred example of the same and that various changes in the shape, size and arrangement of the parts may be resorted to without departing from the spirit of the invention or the scope of the subjoined claims.

I claim:

1. A fishing float comprising, a body portion of buoyant material having a central longitudinal extending bore and a slot extending radially to intersect the surface of said body portion along the entire length thereof; a tubular bushing permanently secured in the bore of said body portion and having a longitudinally extending slot in alignment with the slot of the body portion; an inner unit fitting within said bushing comprising a tubular portion terminating at one end in an outwardly flanged finger grip, said inner unit being provided along its entire length with a slot of a width substantially less than the internal diameter of said tubular portion and insufficient to permit a knot on a fishing line to pass therethrough; and reaching in depth to the axis of said unit; the tubular portion of said inner unit having an internal diameter large enough to accommodate a knot on a fishing line and terminating above the end of said slotted finger grip to thus prevent a knot on a fishing line from passing through said finger grip; said inner unit being rotatably mounted with its tubular portion within said tubular bushing and being secured against longitudinal movement relative thereto.

2. A fishing float comprising, a body portion of buoyant material having a central longitudinal extending bore and a slot extending radially to intersect the surface of said body portion along the entire length thereof; an inner unit fitting within the bore of said body portion comprising a tubular portion terminating at one end in an outwardly flanged finger griup, said inner unit being provided along its entire length with a slot of a width substantially less than the internal diameter of said hollow tube and insufficient to pass a knot on a fishing line therethrough, and reaching in depth to the axis of said tubular portion; the tubular portion of said inner unit having a bore extending to the finger grip large enough to accommodate a knot on a fishing line and terminating above the end of said slotted finger grip to thus prevent a knot on a fishing line from passing through said finger grip; said inner unit being rotatably mounted with its hollow tube within said body portion and being secured against longitudinal movement relative thereto.

References Cited in the file of this patent

UNITED STATES PATENTS

| 2,315,048 | Croft | Mar. 30, 1943 |
| 2,498,815 | McVay | Feb. 28, 1950 |

FOREIGN PATENTS

| 256,404 | Switzerland | Feb. 16, 1949 |